United States Patent [19]

Hooykaas, Carel W. J.

[11] Patent Number: 5,004,357
[45] Date of Patent: * Apr. 2, 1991

[54] BEARING PART FOR A GAS BEARING

[75] Inventor: Hooykaas, Carel W. J., Rotterdam, Netherlands

[73] Assignee: Pelt & Hooykas B.V., Rotterdam, Netherlands

[*] Notice: The portion of the term of this patent subsequent to May 3, 2006 has been disclaimed.

[21] Appl. No.: 393,090

[22] Filed: Aug. 10, 1989

Related U.S. Application Data

[60] Continuation of Ser. No. 189,237, May 2, 1988, abandoned, which is a division of Ser. No. 908,370, Sep. 19, 1986, Pat. No. 4,741,629.

[30] Foreign Application Priority Data

Sep. 27, 1985 [NL] Netherlands ............................ 8502650

[51] Int. Cl.$^5$ ............................................. F16C 32/06
[52] U.S. Cl. ..................................... 384/121; 384/477; 384/625; 384/902; 384/909
[58] Field of Search .................. 384/279, 907, 902, 12, 384/298, 297, 909, 123, 625, 121, 607

[56] References Cited

U.S. PATENT DOCUMENTS

| | | | |
|---|---|---|---|
| 3,578,827 | 5/1971 | Smith | 384/12 |
| 4,397,910 | 8/1983 | Benson et al. | 384/297 |
| 4,558,909 | 12/1985 | Stauber | 384/123 |
| 4,582,368 | 4/1986 | Fujita et al. | 384/279 |

Primary Examiner—Lenard A. Footland
Attorney, Agent, or Firm—Fiddler & Levine

[57] ABSTRACT

A bearing part for a gas bearing comprising two bearing parts, said bearing part formed of a granite-like or metal substance with pores or gas leakage channels and means for injecting a gas between the bearing parts (2, 3) for forming a gap (7) therebetween. The pores (10) in the surfaces of the granite material of these bearing parts are sealed by a non-brittle, transparent, mechanically, machinable pore sealing material (9, 12) for forming gas bearing parts having a non-porous surface. Examples of pore sealing materials (9, 12) for sealing the pores of the bearing parts and bearing part material are polyurethanes, acrylic polymers, epoxy resins, silicone resins, polyvinylidenefluoride resins, aramide resins etc. Preferably the pore sealing material consists of a polymer being curable at low temperatures, particularly below 30° C.

5 Claims, 1 Drawing Sheet

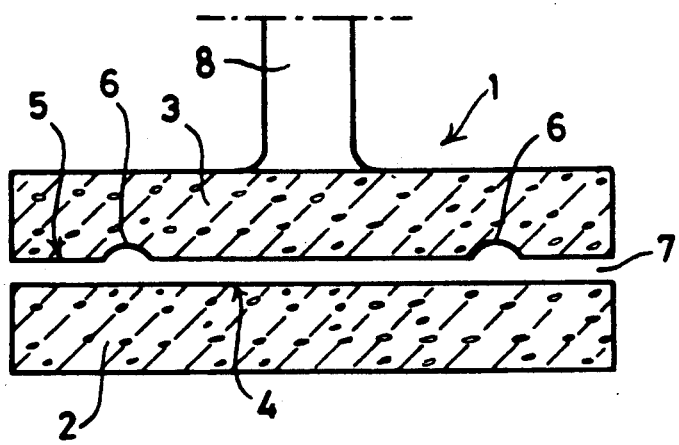
Fig: 1.
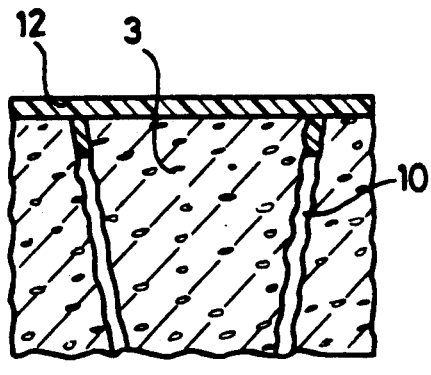
Fig: 3.
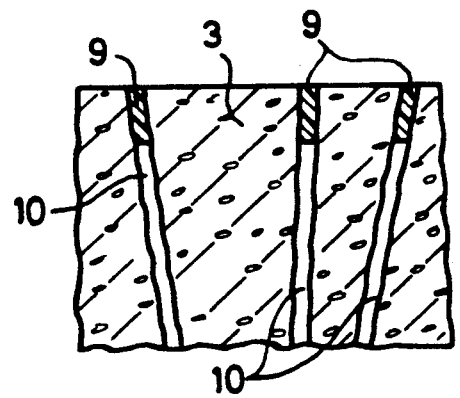
Fig: 2.
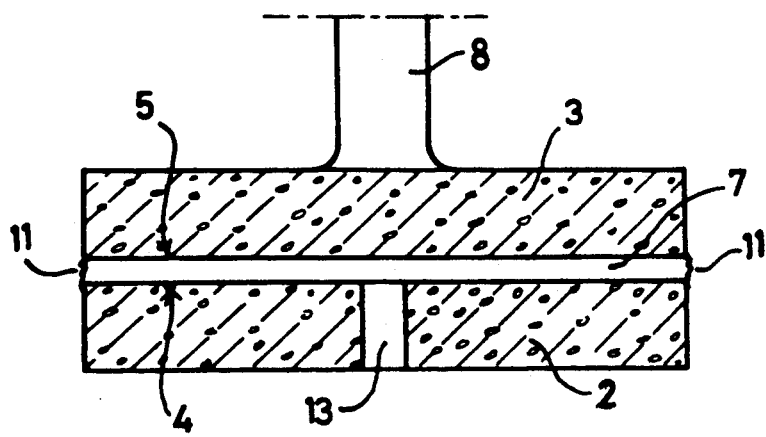
Fig: 4.

BEARING PART FOR A GAS BEARING

This application is a continuation of application 189,237, filed May 2, 1988, now abandoned, which is a division of application 908,370, filed on Sept. 17, 1986, now Pat. No. 4,741,629.

BACKGROUND OF THE INVENTION

This invention relates to a bearing part for a gas or air bearing comprising at least two bearing parts movable with respect to each other, gas injection means being present between the two bearing parts working faces facing each other for injecting a gas in order to be able to maintain a gas gap between the bearing parts.

These air bearings comprising two bearing parts rotatable with respect to each other and made of ceramic material, 10 glass and/or metal are generally known. Such air bearings offer the great advantage that they operate without friction even in the case of large and heavy structures, without any lubricant being used.

To obtain a very thin air gap between the bearing parts, the latter may be provided with air conduction grooves through which ambient air is fed between the two working faces of the rotatable bearing parts to form a very thin air gap. The use of a very small air gap is necessary in order to obtain the desired stability of the air bearing.

A drawback of said known air bearings is that they are expensive because of the use of expensive bearing parts of the materials mentioned.

It has emerged, however, that although replacement of the ceramic material by, for example, natural stone, in particular granite, leads to considerable savings through the use of a much cheaper starting material for the bearing parts, such a large number of pores occurs in the surfaces of the working faces of the bearing parts which are formed in manufacturing the bearing parts from large blocks of natural stone that although the surface is flat, it is not impermeable to gases, as a result of which the gases leak away and an air gap of the desired constant thickness cannot be maintained. This results in the production of undesirable vibrations in the bearing.

The above drawback of the gases leaking away and the production of vibrations is made yet more severe by the fact that the porosity in the surfaces of the working faces of the bearing parts is not often the same everywhere, but varies from point to point.

SUMMARY OF THE INVENTION

The main object of the invention is now to provide a bearing part for a gas bearing in which said disadvantage does not occur.

This object is achieved according to the invention in that, if a bearing part containing pores in the surface of its working face is used, the pores are sealed by a non-brittle pore-sealing material.

Due to sealing the pores in a surface of a working face of the bearing parts, the gas present in the gas gap can no longer leak away through pores, so that a gas gap of a very definite thickness can be continuously maintained, and therefore, also a very definite gas pressure in the region between the two working faces of the two bearing parts facing each other, which working faces are kept apart from each other by a layer of gas, in particular a layer of air.

The pore-sealing material is preferably transparent in order to retain the original appearance of the surface.

It is advisable that the pore-sealing material is mechanically machinable in order to give the bearing part a very smooth surface after treatment with the pore-sealing material.

The pore-sealing material advantageously consists of a hardened hardenable polymer since such polymers can easily be applied in liquid form to the working faces of the bearing parts so that the polymer is satisfactorily absorbed into the pores and can then be converted into a hardened plastic by curing.

Expediently, the pore-sealing material consists of a polymer which can be hardened at a temperature below 30° C., preferably at approximately ambient temperature, more particularly a polymer which can be hardened by ultraviolet light. Particularly in the case of granite, it is desirable to make use of a pore-sealing substance which cures or can be used at approximately 20° C. since it takes a long time before the heated granite has stabilized again and no longer undergoes any deformation during cooling.

The pore-sealing material may be selected with advantage from polymers of the polyurethane type, acrylic resin type, epoxy resin type, silicone resin type, polyvinylidene fluoride type, a poly(p-phenyleneterephthalamide) and the like.

Expediently, the pore-sealing material can be applied as a coating layer to the surface of at least one of the working faces facing each other. In that case, said coating layer is expediently mechanically machinable in order to make the surface sufficiently flat with deviations having less than 10 um as the largest deviation.

Obviously, said coating layer must also be as thin as possible in order to maintain the original strength of the granite-like materials completely.

Preferably, granite-like material is used for a bearing part.

Granite-like materials comprise in particular, deep-lying hard rock material occurring on a large scale in nature and consisting of orthoclase, plagioclase, quartz, hornblende, miotite and/or muscovite and small quantities of materials such as magnetite, granate, zircon and apatite.

Obviously, the minerals mentioned above belong individually to the granite-like substances as well as minerals of the same hardness.

The invention also relates to a bearing part or bearing material suitable for use in a gas bearing according to the invention in which pores in the surface of the working face of a bearing part, preferably based on granite-like materials of porous metals, are sealed by means of a non-brittle pore-sealing material.

DESCRIPTION OF THE DRAWINGS

The invention will now be explained by reference to an exemplary embodiment by means of the drawing, in which:

FIG. 1 - shows a section of an air bearing according to the invention.

FIG. 2 - shows a section of a detail of a bearing part;

FIG. 3 - shows a section of a bearing part with a surface layer;

FIG. 4 - shows a view of a surface of an air bearing part of another type of air bearing.

DESCRIPTION OF THE PREFERRED EMBODIMENTS

FIG. 1 shows an air bearing 1 comprising a first bearing part 2 and a second bearing part 3 which is joined to a shaft 8 of a large or heavy structure not shown in more detail. The working faces 4 and 5, facing each other, of the bearing parts 2 and 3 are flatly constructed and provided with air conduction grooves 6 which ensure that air from outside the air bearing forms an air gap 7 between the bearing parts 2 and 3. This gap 7 is filled with air.

It has been found that if bearing parts formed of granite-like materials are used, there occur in the surfaces of the work faces 4 and 5 of the bearing parts 2 and 3 pores which result in air from the air gap 7 between the two working faces leaking away in an uncontrolled manner and therefore it may be impossible to maintain an air gap of very constant thickness between the two parts.

This drawback makes itself even more severely felt as a result of the fact that the porosity of the faces 4 and 5 varies from one region to another and therefore it may be impossible to take account of the porosity mentioned in the manufacture of the bearing parts.

According to the invention the drawbacks mentioned are eliminated by the pores in the surfaces of the said working faces of the bearing parts 2 and 3 formed of granite-like materials being sealed by a pore-sealing material. In FIG. 2 a section of the working face 3 of a granite bearing part is shown with pores 10 through which air can easily leak away from the air gap 7 to the outside. These pores 10 are sealed at their free end by a pore-sealing material. Said pore-sealing material consists of a cured epoxy resin.

It will be clear that as a result of sealing the pores 10, an air gap 7 of constant uniform thickness can be maintained between the two bearing parts 2 and 3.

Obviously, instead of epoxy resin to form the sealing material 9, use can also be made of a silicone resin or an aramide resin for sealing the pores.

In FIG. 3 an embodiment is shown in which a very thin surface layer 12 is shown on the surface of the working face of a bearing part. This layer 12 should preferably be transparent and mechanically machinable in order to give said surface layer the desired smoothness since deviations amounting to at most 10 um are permissible. The coating layer must be kept very thin in order to retain the strength of the granite-like materials while the air bearing is being started up, when the air gap is created. Particularly in the case of heavy structures, the working face must obviously have a very great strength in order to prevent damage during this starting up of the air bearing.

Instead of epoxy resins or silicone resins, use can also, of course, be made of polyurethane resins, acrylic resin, polyvinylidene fluoride resins, and also of aramide resins (poly(p-phenyleneterephthalamide resins)).

FIG. 4 shows another embodiment of an air bearing in which the first bearing part 2, which is made of granite, is provided with a central air admitting hole 13 for forming an air gap between the surfaces 4 and 5 of the bearing parts 2 and 3.

In order to prevent escape of air, the second bearing part 3 carries a skirt 11 in order to counteract escape of air from the gap.

The pores in the granite surfaces 4 and 5 are sealed by a cured epoxy resin 9 shown in FIG. 2 or FIG. 3.

The pores can be sealed in the same manner if metals or other porous materials are used for the bearing parts.

What is claimed is:

1. A gas bearing part (2) for a gas bearing (1) for supporting another bearing part (3) said bearing parts being movable with respect to each other, when a gas gap is maintained between the bearing part (2) and said another bearing part (3), wherein said bearing part (2) is non-sintered and comprises a granite-like substance or a metal having gas leakage channels (10) in the surface of its working face, which gas leakage channels (10) are sealed by a film of a non-brittle lubricant-free gas leakage channels sealing polymer (9, 12).

2. A bas bearing part according to claim 1, wherein the gas leakage channels sealing material (9, 12) consists of a hardened hardenable polymer.

3. A gas bearing part according to claim 1, wherein the gas leakage channels sealing material (9, 12) comprises a hardened hardenable polymer which has been hardened at approximately ambient temperature.

4. A gas bearing part according to claim 1, wherein the gas leakage channels sealing material (9, 12) comprises a polymer curable by ultraviolet light.

5. A gas bearing according to claim 1, wherein the gas leakage channels sealing material (9, 12) is chosen from a polyurethane resin, an acrylic resin, an epoxy resin, a silicone resin, a polyvinylidene fluoride, and/or a poly (p-phenyleneterephthalamide).

* * * * *